US012273186B2

(12) United States Patent
Mater et al.

(10) Patent No.: US 12,273,186 B2
(45) Date of Patent: Apr. 8, 2025

(54) SYNCHRONIZATION OF CLOCK DOMAINS ON A DATA NETWORK

(71) Applicant: Marvell Asia Pte Ltd, Singapore (SG)

(72) Inventors: Olaf Mater, Linkenheim-Hochstetten (DE); Lukas Reinbold, Oberkirch-Stadelhofen (DE); Xiongzhi Ning, Karlsruhe (DE); Steffen Dolling, Ditzingen (DE)

(73) Assignee: Marvell Asia Pte Ltd, Singapore (SG)

( * ) Notice: Subject to any disclaimer, the term of this patent is extended or adjusted under 35 U.S.C. 154(b) by 551 days.

(21) Appl. No.: 17/652,002

(22) Filed: Feb. 22, 2022

(65) Prior Publication Data

US 2022/0271853 A1  Aug. 25, 2022

Related U.S. Application Data

(60) Provisional application No. 63/152,217, filed on Feb. 22, 2021.

(51) Int. Cl.
*H04J 3/06* (2006.01)
*H04L 7/00* (2006.01)

(52) U.S. Cl.
CPC .......... *H04J 3/0658* (2013.01); *H04L 7/0008* (2013.01)

(58) Field of Classification Search
CPC .................................................... H04J 3/0658
See application file for complete search history.

(56) References Cited

U.S. PATENT DOCUMENTS

| 9,001,951 | B1 | 4/2015 | Kumpulainen |
| 9,547,332 | B1 | 1/2017 | Mizrahi |
| 10,216,220 | B1 * | 2/2019 | Mizrahi ............... H04J 3/0682 |
| 11,223,439 | B1 | 1/2022 | Devineni et al. |
| 2017/0286359 | A1 | 10/2017 | McGowan |
| 2017/0346588 | A1 * | 11/2017 | Prins ..................... H04J 3/0667 |
| 2023/0106507 | A1 * | 4/2023 | Onde .................... H04J 3/0685 375/356 |

* cited by examiner

*Primary Examiner* — Abdeltif Ajid

(57) ABSTRACT

A network includes a first plurality of nodes operating in a first clock domain based on a first clock source, a second plurality of nodes operating in a second clock domain based on a second clock source, and synchronization circuitry accessible to both of the clock domains without requiring network traffic between the clock domains. The synchronization circuitry is configured to periodically calculate a drift rate between the time of day in the respective clock domains. Each node in one of the clock domains is configured to, when sending a message to a node in the other of the clock domains, calculate a time of day in the other of the clock domains based on an actual time of day in the one of the clock domains and the drift rate, and to include, in the message to the node in the other clock domain, the calculated time of day.

20 Claims, 3 Drawing Sheets

SYNCHRONIZATION OF CLOCK DOMAINS ON A DATA NETWORK

CROSS REFERENCE TO RELATED APPLICATION

This disclosure claims the benefit of commonly-assigned U.S. Provisional Patent Application No. 63/152,217, filed Feb. 22, 2021, which is hereby incorporated by reference herein in its entirety.

FIELD OF USE

This disclosure relates to the synchronization of clock domains on a data network. More particularly, this disclosure relates to the determination of a rate of drift between the two clock domains from which a node in a first clock domain can determine the indicated time-of-day in the second clock domain based on indicated time-of-day in the first clock domain, without having to query the second clock domain.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

A data network may include more than one clock domain. For example, an Ethernet-based network may operate under a clock protocol referred to as Precision Time Protocol, or PTP, which establishes a clock domain in which the time of day is set according to a particular node referred to as the "PTP Grandmaster." However, certain devices on the Ethernet network may operate in a sub-network under a different clock protocol. For example, PCIe (Peripheral Component Interconnect—Express) devices operate under their own clock protocol referred to as Precision Time Measurement, or PTM, which establishes a clock domain in which the time of day is set according to a particular node referred to as the "PTM Grandmaster." In situations where a PCIe device under PTM needs to send a time-specific request to a non-PCIe device under PTP, extra network traffic—which may stress available bandwidth resources and possibly result in increased latency—may result as the PCIe device (in the PTM domain) queries the PTP Grandmaster (or another PTP node) to determine the current PTP time.

SUMMARY

In accordance with implementations of the subject matter of this disclosure, a data network includes a first plurality of nodes operating in a first clock domain based on a first clock source, a second plurality of nodes operating in a second clock domain based on a second clock source, and synchronization circuitry accessible to both the first clock domain and the second clock domain without requiring network traffic between the first clock domain and the second clock domain, the synchronization circuitry being configured to periodically calculate a rate of drift between the time of day in the respective first and second clock domains. Each node in one of the first and second clock domains is configured to, when sending a message to a node in another of the first and second clock domains, calculate a time of day in the another of the first and second clock domains based on an actual time of day in the one of the first and second clock domains and the rate of drift between time of day in the respective first and second clock domains, and include, in the message to the node in the another of the first and second clock domains, the calculated time of day in the another of the first and second clock domains.

In a first implementation of such a data network, the synchronization circuitry includes time-of-day capture circuitry configured to determine, at each of two different moments, time-of-day as indicated by the first clock source and time-of-day as indicated by the second clock source, and drift calculation circuitry configured to calculate, from the time-of-day as indicated by the first clock source at a first of the two different moments and the time-of-day as indicated by the second clock source at the first of the two different moments, and the time-of-day as indicated by the first clock source at a second of the two different moments and the time-of-day as indicated by the second clock source at the second of the two different moments, the rate of drift between time of day in the respective first and second clock domains.

According to a first aspect of that first implementation, the time-of-day capture circuitry includes a first set of storage locations for storage of the time-of-day as indicated by the first time source at the second of the two different moments, the time-of-day as indicated by the second time source at the second of the two different moments, and the rate of drift calculated by the drift calculation circuitry, and a second set of storage locations for storage of copies of the time-of-day as indicated by the first time source at the second of the two different moments, the time-of-day as indicated by the second time source at the second of the two different moments, and the rate of drift calculated by the drift calculation circuitry, such that during writing of subsequent values of the time of day as indicated by the first clock source, the time of day as indicated by the second clock source, and a subsequently calculated rate of drift, into the first set of storage locations, the node in the one of the first and second clock domains that is sending a message to the node in the another of the first and second clock domains has access, from the second set of storage locations, to consistent values of the time of day as indicated by the first clock source at the second of the two different moments, the time of day as indicated by the second time source at the second of the two different moments, and the rate of drift.

According to a second aspect of that first implementation, the second one of the at least two different moments is later than the first one of the at least two different moments by 10 ms.

According to a third aspect of that first implementation, the drift calculation circuitry is configured to update the rate of drift between the first time source and the second time source at drift calculation intervals that are longer than an interval between the first one of the at least two different moments and the second one of the at least two different moments.

In a first instance of that third aspect of the first implementation, the drift calculation circuitry is configured to update the rate of drift between time of day in the respective first and second clock domains at drift calculation intervals of at least 1 second.

In a second implementation of such a data network, the first clock domain is an Ethernet Precision Time Protocol domain, and the second clock domain is a PCIe Precision Time Measurement domain.

According to implementations of the subject matter of this disclosure, synchronization circuitry for synchronizing between two clock domains in a data network having a first clock domain based on a first clock source, and a second clock domain based on a second clock source, includes time-of-day capture circuitry configured to determine, at each of two different moments, the time-of-day as indicated by the first clock source and the time-of-day as indicated by the second clock source, and drift calculation circuitry configured to calculate, from the time-of-day as indicated by the first clock source at a first of the two different moments and the time-of-day as indicated by the second clock source at the first of the two different moments, and the time-of-day as indicated by the first clock source at a second of the two different moments and the time-of-day as indicated by the second clock source at the second of the two different moments, the rate of drift between time of day in the respective first and second clock domains.

In a first implementation of such synchronization circuitry, the time-of-day capture circuitry includes a first set of storage locations for storage of the time-of-day as indicated by the first clock source at the second of the two different moments, the time-of-day as indicated by the second clock source at the second of the two different moments, and the rate of drift calculated by the drift calculation circuitry, and a second set of storage locations for storage of copies of the time-of-day as indicated by the first clock source at the second of the two different moments, the time-of-day as indicated by the second clock source at the second of the two different moments, and the rate of drift calculated by the drift calculation circuitry, such that during writing of subsequent values of the time of day as indicated by the first clock source, the time of day as indicated by the second time source, and a subsequently calculated rate of drift, into the first set of storage locations, a node in one of the first and second clock domains that is sending a message to a node in another of the first and second clock domains has access, from the second set of storage locations, to consistent values of the time of day as indicated by the first clock source at the second of the two different moments, the time of day as indicated by the second clock source at the second of the two different moments, and the rate of drift for calculating, from the time of day in the one of the first and second clock domains, the time of day as indicated by the first clock source at the second of the two different moments, the time of day as indicated by the second clock source at the second of the two different moments and the rate of drift, the time of day in the another of the first and second clock domains.

In a second implementation of such synchronization circuitry, the time-of-day capture circuitry configured to determine, at each of two different moments, time-of-day as indicated by the first clock source and time-of-day as indicated by the second clock source is configured to determine, at a first one of the at least two different moments, a first time-of-day as indicated by the first clock source and a second time-of-day as indicated by the second clock source, and determine, at a second one of the at least two different moments, a third time-of-day as indicated by the first clock source and a fourth time-of-day as indicated by the second clock source. The second one of the at least two different moments is later than the first one of the at least two different moments by 10 ms.

In a third implementation of such synchronization circuitry, the drift calculation circuitry is configured to update the rate of drift between the first clock source and the second clock source at drift calculation intervals that are longer than an interval between the first one of the at least two different moments and the second one of the at least two different moments.

According to a first aspect of that third implementation, the drift calculation circuitry is configured to update the rate of drift between the first clock source and the second clock source at drift calculation intervals of at least 1 second.

In a fourth implementation of such synchronization circuitry, the circuitry configured to determine, at each of two different moments, the time-of-day as indicated by the first clock source and the time-of-day as indicated by the second clock source includes circuitry configured to determine, at each of two different moments, the time-of-day as indicated by an Ethernet Precision Time Protocol clock source and the time-of-day as indicated by PCIe Precision Time Measurement clock source.

According to implementations of the subject matter of this disclosure, a method for synchronizing the time-of-day between a first clock domain of a data network and second clock domain of the data network, the first clock domain being based on a first clock source and the second time domain being based on a second clock source, includes determining, at each of two different moments, time of day as indicated by the first clock source and time of day as indicated by the second clock source, and calculating a rate of drift between the first clock source and the second clock source, from the time of day as indicated by the first clock source at a first of the two different moments and the time of day as indicated by the second clock source at the first of the two different moments, and the time of day as indicated by the first clock source at a second of the two different moments and the time of day as indicated by the second clock source at the second of the two different moments.

A first implementation of such a synchronization method further includes, when a node in one of the first and second clock domains sends a time-dependent message to a node in another of the first and second clock domains, determining, at the node in the one of the first and second clock domains, a current time of day in the one of the first and second clock domains according to the clock source in the one of the first and second clock domains, obtaining, at the node in the one of the first and second clock domains, from synchronization circuitry, the time of day as indicated by the first clock source at an earlier one of the two different moments, the time of day as indicated by the second clock source at the earlier one of the two different moments, and the rate of drift, and calculating, at the node in the one of the first and second clock domains, a current time of day in the another of the first and second clock domains from the current time of day in the one of the first and second clock domains, the time of day as indicated by the first clock source at the second one of the two different moments, the time of day as indicated by the second clock source at the earlier one of the two different moments, and the rate of drift.

According to a first aspect, that first implementation of the synchronization method further includes storing copies of the time of day as indicated by the first clock source at the second of the two different moments, the time of day as indicated by the second clock source at the second of the two different moments, and the rate of drift, such that during writing of subsequent values of the time of day as indicated by the first clock, the time of day as indicated by the second clock, and a subsequently calculated rate of drift, into the first set of storage locations, the node in the one of the first and second clock domains has access, from the second set of storage locations, to consistent values of the time of day as indicated by the first clock source at the second of the two different moments, the time of day as indicated by the second clock source at the second of the two different moments, and the rate of drift.

In a second implementation of that synchronization method determining, at each of two different moments, time of day as indicated by the first clock source and time of day as indicated by the second clock source includes determining, at each of two different moments, the time of day as indicated by an Ethernet Precision Time Protocol clock source, and the time of day indicated by a PCIe Precision Time Measurement clock source.

A third implementation of that synchronization method further includes determining, at a first one of the at least two different moments, a first time-of-day as indicated by the first clock source and a second time-of-day as indicated by the second clock source, and determining, at a second one of the at least two different moments, a third time-of-day as indicated by the first clock source and a fourth time-of-day as indicated by the second clock source. The second one of the at least two different moments is later than the first one of the at least two different moments by 10 ms.

A fourth implementation of that synchronization method further includes updating the rate of drift between the first clock source and the second clock source at drift calculation intervals that are longer than an interval between the first one of the at least two different moments and the second one of the at least two different moments.

According to a first aspect of that fourth implementation, updating the rate of drift between the first clock source and the second clock source includes updating the rate of drift between the first clock source and the second clock source at drift calculation intervals of at least 1 second.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
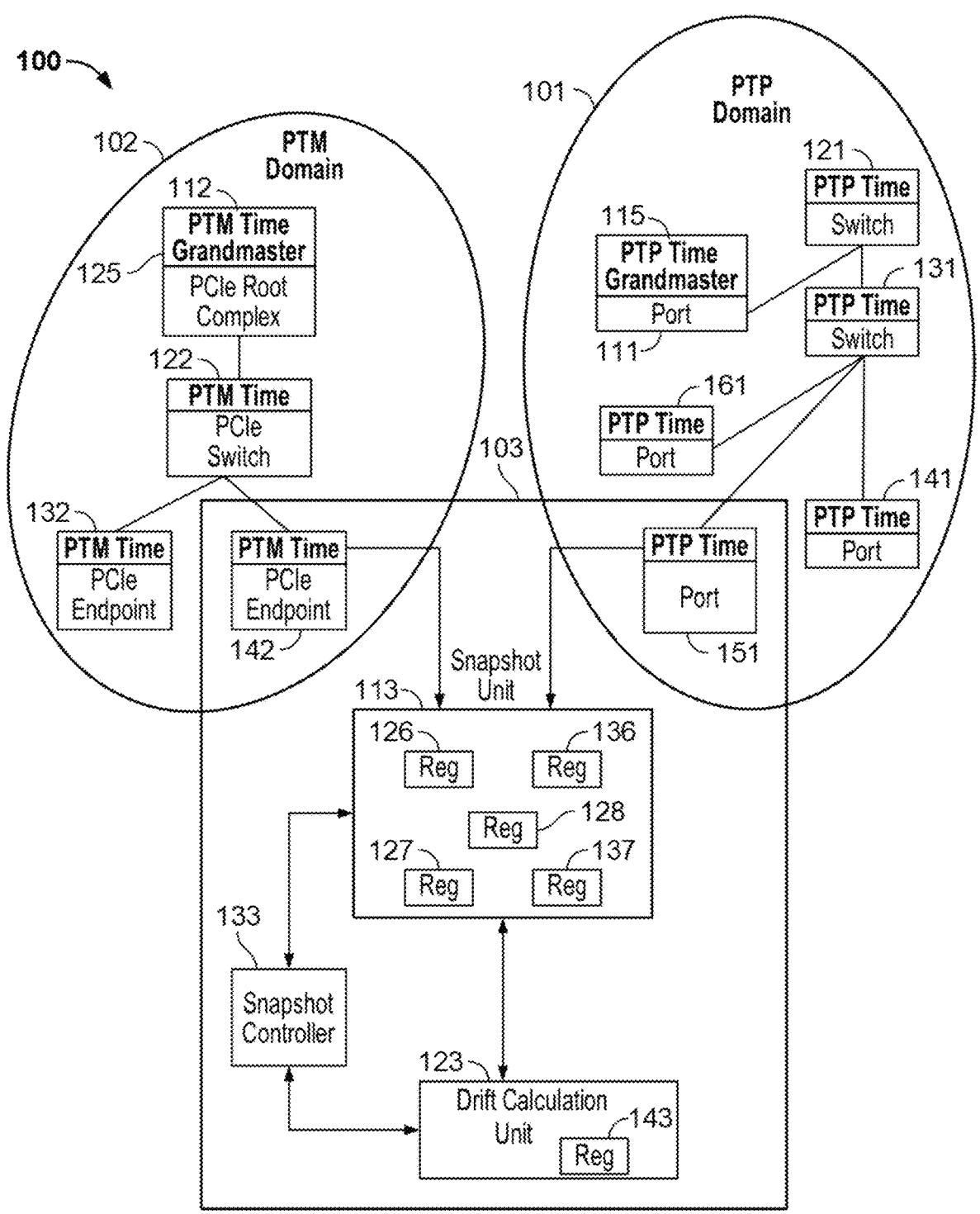
FIG. 1 is a diagram of a network incorporating the subject matter of this disclosure.

As noted above, an Ethernet-based network may operate under a clock protocol referred to as Precision Time Protocol, or PTP, which establishes a clock domain in which the time-of-day is set according to the time maintained by a particular node referred to as the "PTP Grandmaster." However, certain devices on the Ethernet network may operate in a sub-network under a different clock protocol. For example, PCIe (Peripheral Component Interconnect Express) devices operate under their own clock protocol referred to as Precision Time Measurement, or PTM, which establishes a clock domain in which the time of day is set according to the time maintained by a particular node referred to as the "PTM Grandmaster." In situations where a PCIe device under PTM needs to send a time-specific request to a non-PCIe device under PTP, extra network traffic—which may stress available bandwidth resources and possibly result in increased latency—results as the PCIe device (in the PTM domain) queries the PTP Grandmaster (or another PTP node) to determine the current PTP time.

For example, in an automotive Ethernet implementation, a camera or entertainment unit operating under PCIe, and therefore within a PTM clock domain, may send content including audio data to be played back by two or more loudspeakers in the PTP clock domain of the automotive Ethernet network. In order to make sure that both (or all) of the loudspeakers play the content at the same time, the PCIe device may include, in its messages to the different loudspeakers, an instruction to play the content at a particular time of day. For that instruction to result in the desired outcome, the time of day in the instruction should be specified as the PTP time used by the loudspeakers. Therefore, the PCIe content-generating device in the PTM clock domain needs to know the correct time in the PTP clock domain. While the content-generating device in the PTM clock domain could send a query to the PTP grandmaster (or to another node in the PTP clock domain) to retrieve the correct PTP time of day, such requests outside the PCIe domain increase traffic on the automotive Ethernet network and could result in increased latency not only in the systems making the time-of-day requests, but also in other automotive systems.

In order to reduce such excess network traffic and avoid the additional load on bandwidth resources which may cause increased system latencies, as well as time-of-day inaccuracies that may result, in accordance with implementations of the subject matter of this disclosure, synchronization circuitry may be provided to have one clock domain check, relatively infrequently, the time of day in the other clock domain, and to use, solely within the one clock domain, the time-of-day information so obtained to calculate the time of day in the other clock domain when needed during the intervals between the relatively infrequent checks. Thus, rather than burdening the network with frequent time checks across the two clock domains, only the relatively infrequent checks by devices in the one clock domain of the time in the other clock domain would add to network traffic. At the same time, the accuracy of time-of-day determinations is increased.

In implementations of the automotive Ethernet example described above, the PTP clock domain under the Ethernet protocol might be considered the primary clock domain in the automotive Ethernet network. Therefore, it would be expected that the PCIe devices in the PTM clock domain would need to know the time of day in the PTP clock domain. In accordance with implementations of the subject matter of this disclosure, to avoid having the PCIe devices in the PTM clock domain make frequent, network-clogging time-of-day inquiries to the PTP clock domain, and to avoid resulting network-clogging time-of-day replies to those inquiries, synchronization circuitry may be provided, which includes a "time-of-day capture unit" that records the time of day in each of the two clock domains (PTP and PTM) at a given moment. Once at least two such "snapshots" of the time of day in each clock domain are taken at a known interval, a rate of drift between the two clock domains may be calculated by the synchronization circuitry. Therefore, between snapshots, if a device in the PTM clock domain needs to know the time of day in the PTP clock domain, then instead of making an inquiry to the PTP clock domain, the PTM device can query the synchronization circuitry, which resides at least partly in the PTM domain and which can apply the rate of drift calculated after the most recent "snapshot," and the elapsed time since the most recent snapshot, to the PTP time recorded in the most recent snapshot, to derive the current PTP time of day, without requiring network traffic between the two time domains.

Although this implementation has been described in terms of the PTM devices seeking the PTP time of day, there may be situations where a PTP device needs the PTM time of day, and the synchronization circuitry could operate in either direction. More generally, if there are two clock domains in a network, implementations of the subject matter of this disclosure allow a node in either one of the clock domains to determine the time of day in the other of the clock domains.

Periodically, the PTM local clock may be synchronized to, or updated by, the PTM master clock. By default, the PTM local clock update rate is defined by the PCIe specification as 10 ms. In order to maintain the most precise PTM time-of-day, the time-of-day capture unit may be configured to take a PTM snapshot just after the PTM local clock update has occurred.

The PTP time of day is maintained as a hardware counter incremented in steps of 4 ns or 8 ns (corresponding to a hardware clock frequency of either 250 MHz or 125 MHz, respectively). The PTP time of day may be updated by the PTP software stack, which may run in a PTP port in the synchronization circuitry straddling the two clock domains, typically at intervals of 125 ms.

Because each of the two clock domains may be subject to its own inherent drift, and because the rate of drift calculated by the synchronization circuitry may have limited precision (e.g., because only a certain number of bits may be allocated for storing the calculated rate of drift), the rate of drift should be recalculated at intervals based on the maximum allowed drift of each clock domain (typically 100 ppm for each clock domain). As frequently as once per second (but possibly less frequently), and less frequently than each snapshot occurrence, the rate of drift is recalculated using the current time-of-day snapshots of the two clock domains and a preceding set of time-of-day snapshots of the two clock domains. In some implementations, the preceding set of time-of-day snapshots of the two clock domains is the immediately preceding set of time-of-day snapshots of the two clock domains, with earlier snapshots being discarded, while in other implementations, some number of earlier snapshots are retained, which may allow for more accurate calculation of drift rate. In some implementations, the interval between snapshots may be 10 ms.

In some instances, it may occur that a device in one of the clock domains needs to determine the time of day in the other clock domain at a moment when a new time-of-day snapshot is being captured. If the synchronization circuitry attempts to calculate the time of day in the other clock domain during that moment, it may retrieve inconsistent snapshot values, where the snapshot value from one time domain is the newly-stored current time of day but the snapshot value from the other time domain is still the previous time of day, which would produce erroneous results. To avoid such a result, the snapshot unit may include a locking mechanism to prevent inconsistent snapshot values from being retrieved.

To implement such a locking mechanism, in accordance with implementations of the subject matter of this disclosure, the time-of-day capture unit may include two sets of storage locations (e.g., memory registers). Once a newly-captured set of times of day (i.e., a newly captured set of data including the times of day from both clock domains) has been acquired and stored in a first storage location, that data may be copied into a second storage location (e.g., a second set of memory registers), but until that new capture event is complete, the second storage location would contain the previous snapshot values. If a node in one of the time domains needs to query the stored values in the time-of-day capture unit in the course of an interval during which the time-of-day capture unit is capturing new time-of-day data, the node can query the data copies stored in the second storage location and therefore retrieve consistent values that will yield a valid calculation of the time of day in the other clock domain.

Thus, in some implementations, only after the time-of-day capture unit has completed storage of the times of day from both clock domains will it copy those newly-captured values to the second storage location. From that moment until the next update of the captured times of day, a node can query either storage location. However, because the values in the second storage location are always the stable and reliably consistent values, in some implementations the second storage location is always the location that is queried.

Although the rate of drift between the two clock domains is not captured, but rather calculated from the captured time-of-day data, for ease of operation, the calculated rate of drift also may be stored in a storage location of the time-of-day capture unit, and may be queried by a node needing to determine the time-of-day in a different clock domain. Alternatively, the calculated drift rate may be stored in a storage location of the drift calculation unit. In implementations in which the rate of drift is stored in the time-of-day capture unit and the time-of-day capture unit also has a second set of storage locations, the rate of drift, once calculated, can be copied into one of the second storage locations for querying by any node.

Figure 2:
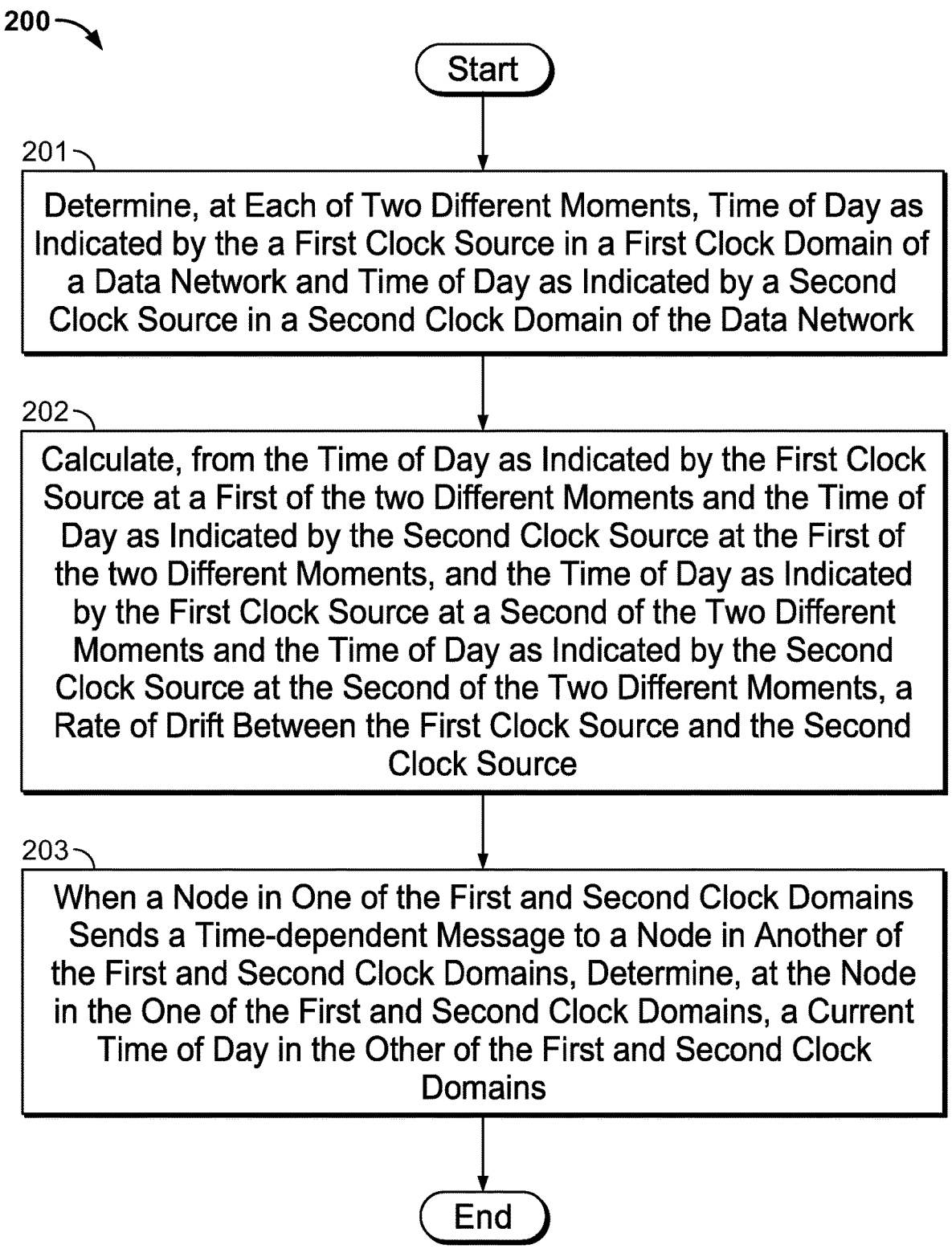
FIG. 2 is a flow diagram illustrating a method according to implementations of the subject matter of this disclosure.
Figure 3:
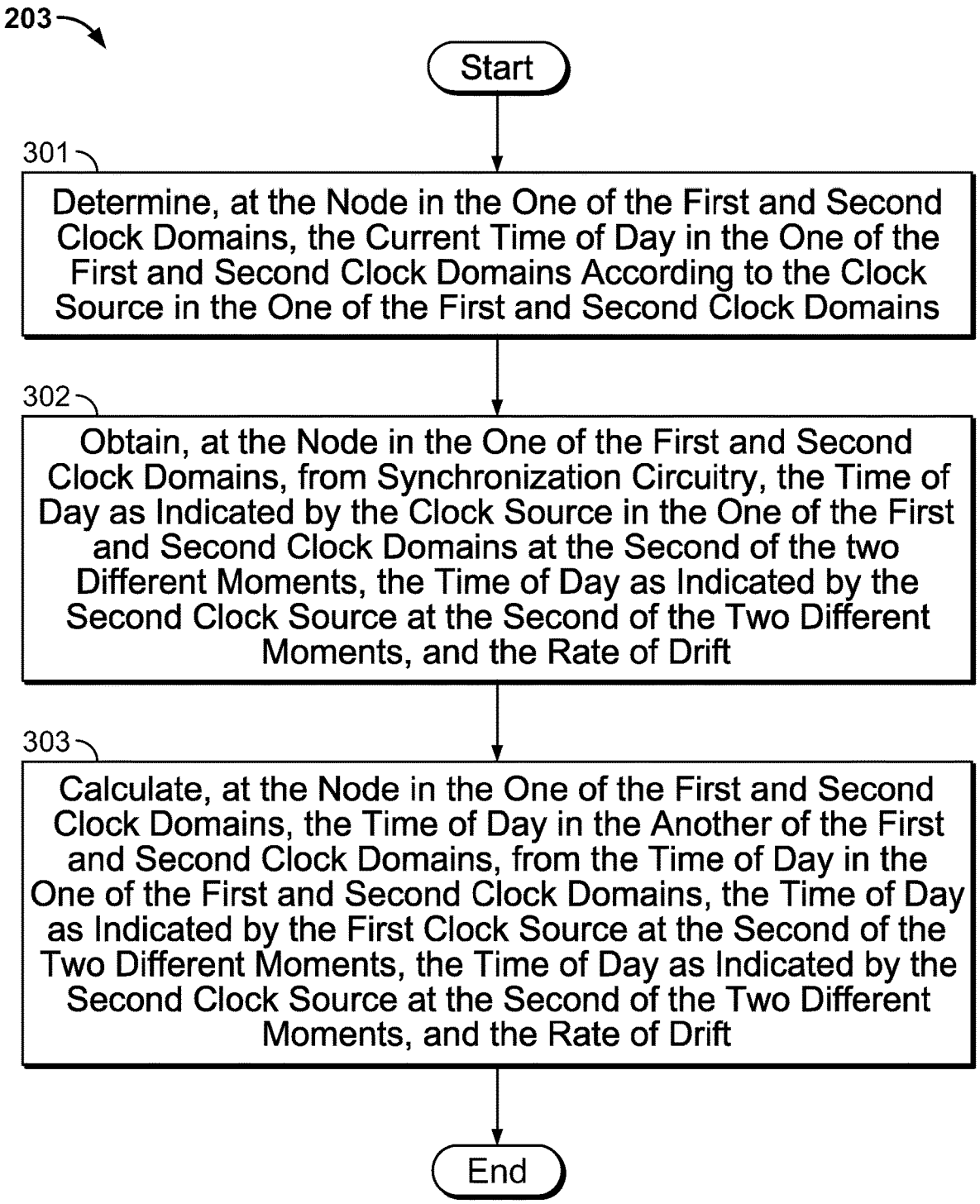
FIG. 3 is a flow diagram illustrating an implementation, according to the subject matter of this disclosure, of a portion of the method of FIG. 2.

The subject matter of this disclosure may be better understood by reference to FIGS. 1-3.

FIG. 1 illustrates a network 100 in which the subject matter of this disclosure may be implemented. Network 100 may include a first clock domain 101 and a second clock domain 102. In this implementation, synchronization circuitry 103 may straddle the two clock domains 101, 102, and may include time-of-day capture unit (i.e., "snapshot unit") 113, and drift calculation unit 123. In accordance with the discussion above, network 100 may be, for example, an automotive network that is primarily an Ethernet network having at least nodes 111, 121, 131, 141, 151, which operate in a PTP clock domain 101. Node 111 may host the aforementioned PTP Grandmaster 115, which provides a standard time source for all nodes in time domain 101. PTP Grandmaster 115 may be initialized from a trusted external clock source (not shown).

As discussed above, automotive network 100 also may have a sub-network 102 of PCIe nodes 112, 122, 132, 142 operating in a PTM clock domain in which PTM Grandmaster 125 in PCIe Root Complex node 112 provides a standard time source for the other nodes in time domain 102. PTM Grandmaster 125 may be initialized from a trusted external clock source (not shown).

However, even though both PTP Grandmaster 115 and PTM Grandmaster 125 may be initialized from a trusted external clock source, and possibly even from the same trusted external clock source, the two Grandmasters 115, 125 may operate at slightly different rates and drift from one another. Therefore, the time of day in clock domain 102 may differ from the time of day in clock domain 101. As a result, when a node in one of clock domains 101, 102 needs to send a time-dependent message to a node in the other of clock domains 101, 102, such as in the audio content playing scenario discussed above (where, e.g., PCIe node 132 is an audio content source and Ethernet nodes 151, 161 are loudspeakers), the node sending the message (here, node 132 in clock domain 102) needs to determine the time of day in the other clock domain (here, clock domain 101) so that it can instruct the nodes in the other clock domain (here, nodes 151, 161 in clock domain 101) when to play the content.

One alternative would be for node 132 to query a node in clock domain 101, such as node 151. But, as previously noted, such an alternative would add network traffic between the two clock domains for the query and the reply, and would reduce accuracy by adding latency while the query is made, transmitted, received and acted on, and the reply is returned, received and decoded. Therefore, in accordance with implementations of the subject matter of this disclosure, node 132 (in the PTM clock domain) can calculate the time in the PTP clock domain based on the current time of day in the PTM clock domain, the drift rate between the two clock domains as calculated by circuitry 123, and the times of day in the two clock domains at the most recent time-of-day snapshot:

$$PTP_{now} = (PTM_{now} - PTM_{snapshot}) \times DriftRate_{PTP/PTM} + PTP_{snapshot}$$

where $$DriftRate_{PTP/PTM} = \frac{(PTP_{snapshot} - PTP_{previous\_snapshot})}{(PTM_{snapshot} - PTM_{previous\_snapshot})}$$

If, in a different situation, a PTP node needs to calculate the PTM time, the calculation would be as follows:

$$PTM_{now} = (PTP_{now} - PTP_{snapshot}) \times DriftRate_{PTM/PTP} + PTM_{snapshot}$$

where $$DriftRate_{PTM/PTP} = \frac{(PTM_{snapshot} - PTM_{previous\_snapshot})}{(PTP_{snapshot} - PTP_{previous\_snapshot})}$$

The time-of-day snapshots and drift rate calculations may be performed by synchronization circuitry 103, including time-of-day capture unit ("snapshot unit") 113 and drift rate calculation unit 123. Synchronization circuitry 103 logically straddles first and second clock domains 101, 102, so that network traffic between the two time domains is not necessary for time-of-day queries by one of the time domains. Nevertheless, the physical location of synchronization circuitry 103 may be entirely in one clock domain 101, 102 or the other, or in neither clock domain, or physically straddling both domains as shown (i.e., some components of synchronization circuitry 103 may be in one of clock domains 101, 102 and other components of synchronization circuitry 103 may be in the other of clock domains 101, 102, while still other components of synchronization circuitry 103 may be in neither clock domain 101 nor clock domain 102).

In operation, time-of-day capture unit 113 may obtain the PTP snapshot time from node 151 in PTP clock domain 101, and may obtain the PTM snapshot time from any node (e.g., node 142 as shown) in PTM clock domain 102, storing the PTP snapshot value and the PTM snapshot value in primary snapshot registers 126, 136, all under control of snapshot controller 133. As noted above, after completion of the snapshot obtaining process, the PTP and PTM snapshot values may be copied into secondary snapshot registers 127, 137 to provide a stable consistent source of the PTP and PTM snapshot values, particularly during a subsequent snapshot update event when values of the PTP and PTM snapshot values in primary snapshot registers 126, 136 will be in the process of changing.

However, immediately after new PTP and PTM snapshot values are obtained and stored in primary snapshot registers 126, 136, there exists a situation in which new PTP and PTM snapshot values are present in primary snapshot registers 126, 136, and the previous PTP and PTM snapshot values are present in secondary snapshot registers 127, 137. While that situation exists, before the new PTP and PTM snapshot values are copied into secondary snapshot registers 127, 137, drift calculation unit 123 may use the new and previous new PTP and PTM snapshot values in primary snapshot registers 126, 136 and secondary snapshot registers 127, 137 to calculate the drift rate as discussed above. The drift rate, once calculated, may, for convenience, be stored in snapshot unit 113 along with the PTP and PTM snapshot values. A register 128 may be provided in snapshot unit 113 for that purpose. In other implementations, the drift rate may be stored in a register 143 in drift calculation unit 123

Alternatively, the logic can be configured such that the primary snapshot registers 126, 136 are never queried while a new set of PTM and PTP snapshot values is being acquired. However, in such an alternative, storage for the previous PTM and PTP snapshot values would still be provided to enable calculation of the drift rate. In fact, it may be desirable to store multiple sets of older snapshot values to enable more accurate calculation of the drift rate. However, the most recent set of snapshot values would always be used for a current time-of-day conversion.

When the PTM and PTP snapshot values are captured, it is important that the PTM time of day and the PTP time of day are sampled at the same moment. The PTM time-of-day clock or counter typically runs on at a frequency based on the speed setting of the PCIe bus, while the PTP time-of-day clock or counter typically runs at a frequency based on the network speed. For accurate sampling, each time-of-day clock or counter is sampled in its native clock domain. A trigger signal synchronized to the two clock domains may be provided. Snapshot unit 113 may include a compensation mechanism to prevent differences in the propagation delay of the trigger signal to the different clock domains from causing inconsistent snapshot values to be captured. For example, in some implementations, logic in the hardware snapshot unit may be provided that uses the speed settings of the PCIe bus and network port to determine the difference in the propagation delays and automatically delay the faster path—e.g., by adding flipflops to achieve about the same delay as in the slower path. Accordingly, nearly simultaneous sampling of the time-of-day clocks or counters in the PTM domain and the PTP domain may be achieved.

In some implementations (not shown), there may be multiple PTP clock domains (e.g., one clock domain providing the current UTC time, and another more accurate time domain) communicating with a single PTM clock domain. As there is only a single PTM clock domain to be supported, even though there may be separate synchronization circuits for each PTP clock domain, those separate synchronization circuits may share circuitry for retrieving the PTM time-of-day snapshot, although each separate synchronization circuit would map its own copy of the PTM time-of-day snapshot to its own PTM time-of-day register.

In addition, in such implementations, to reduce wiring congestion, the PTP time-of-day sampling by the multiple PTP domains can be multiplexed onto a single bus. Logic, such as a state machine, can be provided to control the sequencing of the multiplexed snapshot sampling operations. Correction logic can be provided to recalculate the snapshot values for simultaneous sampling, based on the actual snapshot values and the known delays between the sampling actions.

A method 200 according to implementations of the subject matter of this disclosure is diagrammed in FIG. 2.

Method 200 begins at 201 where it is determined, at each of two different moments, time of day as indicated by a first clock source in a first clock domain of a data network and time of day as indicated by a second clock source in a second clock domain of the data network. At 202, a rate of drift between the first clock source and the second clock source is calculated, from the time of day as indicated by the first clock source at a first of the two different moments and the time of day as indicated by the second clock source at the first of the two different moments, and the time of day as indicated by the first clock source at a second of the two different moments and the time of day as indicated by the second clock source at the second of the two different moments. At 203, when a node in one of the first and second clock domains sends a time-dependent message to a node in another of the first and second clock domains, it is determined, at that node in the one of the first and second clock domains, a current time of day in the other of the first and second clock domains, and method 200 ends.

An implementation of the determination at 203 is diagrammed in FIG. 3. At 301, the node in the one of the first and second clock domains determines the current time of day in that one of the first and second clock domains according to the clock source in that one of the first and second clock domains. At 302, the node in the one of the first and second clock domains obtains, from synchronization circuitry, the time of day as indicated by the clock source in the one of the first and second clock domains at the second of the two different moments, the time of day as indicated by the second clock source at the second of the two different moments, and the rate of drift. At 303, the node in the one of the first and second clock domains calculates the time of day in the another of the first and second clock domains, from the time of day in the one of the first and second clock domains, the time of day as indicated by the first clock source at the second of the two different moments, the time of day as indicated by the second clock source at the second of the two different moments, and the rate of drift, and determination 203 ends.

Thus it is seen that the determination of a rate of drift between the two clock domains from which a node in a first clock domain can determine the indicated time-of-day in the second clock domain based on indicated time-of-day in the first clock domain, without having to query the second clock domain, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A data network comprising:
   a first plurality of nodes operating in a first clock domain based on a first clock source;
   a second plurality of nodes operating in a second clock domain based on a second clock source; and
   synchronization circuitry accessible to both the first clock domain and the second clock domain without requiring network traffic between the first clock domain and the second clock domain, the synchronization circuitry including time-of-day capture circuitry and drift calculation circuitry, and being configured to periodically calculate a rate of drift between time of day in the respective first and second clock domains; wherein:
   each node in one of the first and second clock domains is configured to, when sending a message to a node in another of the first and second clock domains:
   calculate a time of day in the another of the first and second clock domains based on an actual time of day in the one of the first and second clock domains and the rate of drift between time of day in the respective first and second clock domains, and
   include, in the message to the node in the another of the first and second clock domains, the calculated time of day in the another of the first and second clock domains; and
   the data network further comprises:
   a plurality of storage locations configured to store previous indications of the time of day as indicated by the first clock source and the second clock source, and previous values of the rate of drift, to provide consistent values of the time of day and the rate of drift during writing of subsequent values of the time of day, and a subsequently calculated rate of drift.

2. The data network of claim 1 wherein:
   the time-of-day capture circuitry is configured to determine, at each of two different moments, time-of-day as indicated by the first clock source and time-of-day as indicated by the second clock source; and
   the drift calculation circuitry is configured to calculate, from the time-of-day as indicated by the first clock source at a first of the two different moments and the time-of-day as indicated by the second clock source at the first of the two different moments, and the time-of-day as indicated by the first clock source at a second of the two different moments and the time-of-day as indicated by the second clock source at the second of the two different moments, the rate of drift between time of day in the respective first and second clock domains.

3. The data network of claim 2 wherein the plurality of storage locations comprises:
   a first set of storage locations for storage of the time-of-day as indicated by the first time source at the second of the two different moments, the time-of-day as indicated by the second time source at the second of the two different moments, and the rate of drift calculated by the drift calculation circuitry; and
   a second set of storage locations for storage of copies of the time-of-day as indicated by the first time source at the second of the two different moments, the time-of-day as indicated by the second time source at the second of the two different moments, and the rate of drift calculated 1by the drift calculation circuitry, such that during writing of subsequent values of the time of day as indicated by the first clock source, the time of day as indicated by the second clock source, and a subsequently calculated rate of drift, into the first set of storage locations, the node in the one of the first and second clock domains that is sending a message to the node in the another of the first and second clock domains has access, from the second set of storage locations, to consistent values of the time of day as indicated by the first clock source at the second of the two different moments, the time of day as indicated by the second time source at the second of the two different moments, and the rate of drift.

4. The data network of claim 3 wherein the second one of the at least two different moments is later than the first one of the at least two different moments by 10 ms.

5. The data network of claim 3 wherein the drift calculation circuitry is configured to update the rate of drift between the first time source and the second time source at drift calculation intervals that are longer than an interval between the first one of the at least two different moments and the second one of the at least two different moments.

6. The data network of claim 5 wherein the drift calculation circuitry is configured to update the rate of drift between time of day in the respective first and second clock domains at drift calculation intervals of at least 1 second.

7. The data network of claim 1 wherein:
the first clock domain is an Ethernet Precision Time Protocol domain; and
the second clock domain is a Peripheral Component Interconnect Express Precision Time Measurement domain.

8. Synchronization circuitry for synchronizing between two clock domains in a data network having a first clock domain based on a first clock source, and a second clock domain based on a second clock source, the synchronization circuitry comprising:
time-of-day capture circuitry configured to determine, at each of two different moments, time-of-day as indicated by the first clock source and time-of-day as indicated by the second clock source;
drift calculation circuitry configured to calculate, from the time-of-day as indicated by the first clock source at a first of the two different moments and the time-of-day as indicated by the second clock source at the first of the two different moments, and the time-of-day as indicated by the first clock source at a second of the two different moments and the time-of-day as indicated by the second clock source at the second of the two different moments, the rate of drift between time of day in the respective first and second clock domains; and
a plurality of storage locations configured to store previous indications of the time of day as indicated by the first clock source and the second clock source, and previous values of the rate of drift, to provide consistent values of the time of day and the rate of drift during writing of subsequent values of the time of day, and a subsequently calculated rate of drift.

9. The synchronization circuitry of claim 8 wherein the plurality of storage locations comprises:
a first set of storage locations for storage of the time-of-day as indicated by the first clock source at the second of the two different moments, the time-of-day as indicated by the second clock source at the second of the two different moments, and the rate of drift calculated by the drift calculation circuitry; and
a second set of storage locations for storage of copies of the time-of-day as indicated by the first clock source at the second of the two different moments, the time-of-day as indicated by the second clock source at the second of the two different moments, and the rate of drift calculated by the drift calculation circuitry, such that during writing of subsequent values of the time of day as indicated by the first clock source, the time of day as indicated by the second time source, and the subsequently calculated rate of drift, into the first set of storage locations, a node in one of the first and second clock domains that is sending a message to a node in another of the first and second clock domains has access, from the second set of storage locations, to consistent values of the time of day as indicated by the first clock source at the second of the two different moments, the time of day as indicated by the second clock source at the second of the two different moments, and the rate of drift for calculating, from the time of day in the one of the first and second clock domains, the time of day as indicated by the first clock source at the second of the two different moments, the time of day as indicated by the second clock source at the second of the two different moments and the rate of drift, the time of day in the another of the first and second clock domains.

10. The synchronization circuitry of claim 9 wherein the time-of-day capture circuitry configured to determine, at each of two different moments, time-of-day as indicated by the first clock source and time-of-day as indicated by the second clock source is configured to:
determine, at a first one of the at least two different moments, a first time-of-day as indicated by the first clock source and a second time-of-day as indicated by the second clock source; and
determine, at a second one of the at least two different moments, a third time-of-day as indicated by the first clock source and a fourth time-of-day as indicated by the second clock source; wherein:
the second one of the at least two different moments is later than the first one of the at least two different moments by 10 ms.

11. The synchronization circuitry of claim 9 wherein the drift calculation circuitry is configured to update the rate of drift between the first clock source and the second clock source at drift calculation intervals that are longer than an interval between the first one of the at least two different moments and the second one of the at least two different moments.

12. The synchronization circuitry of claim 11 wherein the drift calculation circuitry is configured to update the rate of drift between the first clock source and the second clock source at drift calculation intervals of at least 1 second.

13. The synchronization circuitry of claim 9 wherein:
the circuitry configured to determine, at each of two different moments, the time-of-day as indicated by the first clock source and the time-of-day as indicated by the second clock source, comprises circuitry configured to determine, at each of two different moments, the time-of-day as indicated by an Ethernet Precision Time Protocol clock source and the time-of-day as indicated by a Peripheral Component Interconnect Express Precision Time Measurement clock source.

14. A method for synchronizing time-of-day between a first clock domain of a data network and second clock domain of the data network, the first clock domain being based on a first clock source and the second time domain being based on a second clock source, the method comprising:
determining, at each of two different moments, time of day as indicated by the first clock source and time of day as indicated by the second clock source;
calculating a rate of drift between the first clock source and the second clock source, from the time of day as indicated by the first clock source at a first of the two different moments and the time of day as indicated by the second clock source at the first of the two different moments, and the time of day as indicated by the first clock source at a second of the two different moments and the time of day as indicated by the second clock source at the second of the two different moments; and storing previous indications of the time of day as indicated by the first clock source and the second clock source, and previous values of the rate of drift, into a plurality of storage locations for use to provide consistent values of the time of day and the rate of drift during writing of subsequent values of the time of day, and a subsequently calculated rate of drift.

15. The synchronization method of claim 14 further comprising, when a node in one of the first and second clock domains sends a time-dependent message to a node in another of the first and second clock domains:

determining, at the node in the one of the first and second clock domains, a current time of day in the one of the first and second clock domains according to the clock source in the one of the first and second clock domains;

obtaining, at the node in the one of the first and second clock domains, from synchronization circuitry, the time of day as indicated by the first clock source at an earlier one of the two different moments, the time of day as indicated by the second clock source at the earlier one of the two different moments, and the rate of drift; and calculating, at the node in the one of the first and second clock domains, a current time of day in the another of the first and second clock domains from the current time of day in the one of the first and second clock domains, the time of day as indicated by the first clock source at the second one of the two different moments, the time of day as indicated by the second clock source at the earlier one of the two different moments, and the rate of drift.

16. The synchronization method of claim 15 wherein the storing comprises:

storing copies of the time of day as indicated by the first clock source at the second of the two different moments, the time of day as indicated by the second clock source at the second of the two different moments, and the rate of drift, such that during writing of subsequent values of the time of day as indicated by the first clock, the time of day as indicated by the second clock, and a subsequently calculated rate of drift, into the first set of storage locations, the node in the one of the first and second clock domains has access, from the second set of storage locations, to consistent values of the time of day as indicated by the first clock source at the second of the two different moments, the time of day as indicated by the second clock source at the second of the two different moments, and the rate of drift.

17. The synchronization method of claim 16 wherein:

determining, at each of two different moments, time of day as indicated by the first clock source and time of day as indicated by the second clock source comprises determining, at each of two different moments, the time of day as indicated by an Ethernet Precision Time Protocol clock source, and the time of day indicated by a Peripheral Component Interconnect Express Precision Time Measurement clock source.

18. The synchronization method of claim 16 further comprising:

determining, at a first one of the at least two different moments, a first time-of-day as indicated by the first clock source and a second time-of-day as indicated by the second clock source; and determining, at a second one of the at least two different moments, a third time-of-day as indicated by the first clock source and a fourth time-of-day as indicated by the second clock source; wherein:

the second one of the at least two different moments is later than the first one of the at least two different moments by 10 ms.

19. The synchronization method of claim 16 further comprising updating the rate of drift between the first clock source and the second clock source at drift calculation intervals that are longer than an interval between the first one of the at least two different moments and the second one of the at least two different moments.

20. The synchronization method of claim 19 comprising updating the rate of drift between the first clock source and the second clock source at drift calculation intervals of at least 1 second.

* * * * *